Dec. 13, 1955     E. DEBLER     2,726,520

INTERLOCKING FINGER RING ASSEMBLY

Filed Jan. 29, 1954

Inventor
Edmund Debler
By his attorneys

Howson and Howson

United States Patent Office 2,726,520
Patented Dec. 13, 1955

2,726,520
INTERLOCKING FINGER RING ASSEMBLY

Edmund Debler, Hollis, N. Y., assignor to J. R. Wood & Sons, Inc., New York, N. Y., a corporation of New York Application January 29, 1954, Serial No. 407,049

3 Claims. (Cl. 63—15.3)

This invention relates to an interlocking finger ring assembly and more particularly to the connector which locks the companion finger rings together.

When each of a pair of finger rings has ornamentation, it is frequently desirable to keep the rings so aligned that the ornamental parts are oriented with relation to each other. This is particularly true, for example, in connection with engagement rings and wedding rings. In interlocking means heretofore provided it was necessary that the two rings be on the finger in order to be sure that they remained fastened together. It is desirable that the rings be able to stay together when taken off as a unit or for display purposes, until they are purposely released from each other. The object of my invention is to provide a simple yet ornamental locking means which will keep the rings interlocked until purposely released.

My locking means are characterized by the fact that there are two opposed resilient elements on one of the rings and that the connector which is carried by the other ring is forced between those elements. When the rings are together in locked position, the neck of the connector is held in a tapered opening between the two elements or wings by spring action. In this way the two rings are held together until purposely released.

In the drawings:

Figs. 1, 2 and 3 show the setting of one ring and part of the connector of a finger ring assembly embodying my invention; Fig. 1 showing the end of the connector inserted in the framework of the setting above the entrance space of my novel resilient members; Fig. 2 showing the neck of the connector forced down to the point of closest approach of the opposed convex edges of the two resilient members, i. e., to the intermediate, restricted neck space; and Fig. 3 showing the connector in the lower locking space between the opposed convex edges of the resilient members.

Figs. 4, 5 and 6, which correspond, respectively, to Figs. 1, 2 and 3, are diagrammatic face views of one side wall of the setting of one of the rings of Figs. 1–3, showing the shape of the resilient members and their deformation as the connector is moved down into locking position.

Figs. 7, 8 and 9, corresponding, respectively, to Figs. 1 and 4, 2 and 5, 3 and 6, are vertical views in section through the wall of Figs. 1–3, taken on the lines 7—7, 8—8 and 9—9 of Figs. 4, 5 and 6, and at right angles thereto, showing the outward bulge of the resilient members during the passage of the connector between their opposed convex edges.

Fig. 11 shows two rings of the interlocking finger ring assembly whose construction and operation have been delineated in Figs. 1–10; while

In my prior patent application Ser. No. 295,047, filed June 23, 1952, entitled "Improvement in Finger Rings," there is shown and described an interlocking finger ring assembly containing a simplified and effective means for locking the rings together. However, in that construction there is no assurance that the rings will stay together except when they are on the wearer's finger. It often is considered desirable that the rings stay together as a unit until purposely released. To that end I have invented the improved form of interlocking finger ring assembly which I will now describe.

Figure 11:
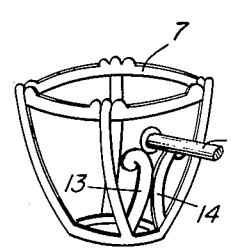

I have shown in Fig. 11 an engagement ring A and a wedding ring B which are so constructed that they can be interlocked together. On the wedding ring B there is a connector generally designated in Fig. 11 by the reference character 1. As seen in some of the other figures, the end of this connector has a head 2 and a neck 3, the latter, of course, being of less diameter than the head. This connector 1 projects laterally from the wedding ring B and is shown located at the midpoint of the ornamentation on the ring. The engagement ring A has an open ornamental gem-setting basket framework 4 to hold the diamond 5 in position. In the embodiment illustrated in the drawings, this framework is tapered in shape. It consists of a lower circle 6 lying horizontally opposite the enside of the ring, a larger circle or gem-setting member 7 lying horizontally outside the ring and spaced from the ring body, and four titled ribs 8 spaced equally about the two circles connecting them together. The space between two of the ribs constitutes the face or wall of the setting on one side of the ring, and the space between the other two ribs constitutes the wall on the other side of the ring. I will now describe the manner in which I construct one of these walls so as to cooperate with the connector in making my form of locking means.

Figure 6:
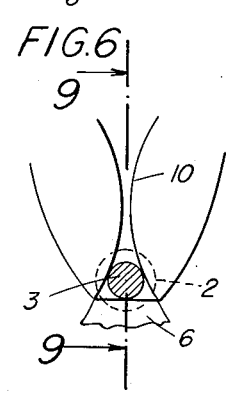

Referring first to the embodiment of Figs. 1–10, it will be noted that I provide a pair of arcuate members 9 and 10, which members are resilient, i. e., having a spring action. The outer edges of the two resilient members 9 and 10 are convex while their inner edges are concave and said members are mounted within the space between two of the ribs 8 at one side of the ornamental gem-setting basket framework with their lower edges spaced and their convex edges disposed in opposed relation, it being noted that said resilient members 9 and 10, when so arranged, constitute a part of the ornamental design of the gem-setting basket frame-work. It will be noted, further, that, when so arranged, said resilient members 9 and 10 provide between their opposed convex edges a lower locking space adjacent the ring body, an intermediate resilient, restricted neck space, and an upper resilient entrance space, which spaces are adapted to receive therein the neck portion of the headed connector 1, the arrangement being such that the concave edge of each of said opposed resilient members is spaced from the adjacent ribs 8 to provide adjacent the restricted neck space a substantially semicircular opening which not only permits flexing of said resilient members 9 and 10 in a manner to be presently described but also contributes to the ornamental appearance of the gem-setting basket frame-work. The resilient members 9 and 10 normally are disposed within the plane of that side of the basket frame-work in which they are mounted. In the embodiment of Figs. 1–10, the opposed convex edges of the resilient members 9 and 10 do not actually touch each other at any point being only substantially adjoining, but this is not necessarily true, as can be seen by examining the embodiment of Figs. 12 and 13 where normally the intermediate portions of the opposed convex edges of said members are in contact at their point of closest approach. In the embodiment of Figs. 1–10, each resilient member is a thin metal strip having an outer convex edge and an inner concave edge, said strip being fastened at its lower end 11 and at its upper end 12 to the adjacent rib 8. It can be seen from Fig. 5 that each of the resilient members 9 and 10 is resilient in the plane defined by the segments of the upper and lower circles 7, 6 and the adjacent ribs 8. In this way, since the space between the opposed convex edges of said resilient members 9 and 10 at the intermediate, restricted neck space therebetween is normally less than the diameter of the neck 3 of the connector 1 (Figs. 4 and 6), the resilient members resist the passage of the neck through said restricted neck space. It will also be noted that the head 2 of the connector is too large to pass outwardly of the locking space defined by the spaced lower convex edges of the resilient members 9 and 10. I locate the upper connection 12 between each resilient member and its adjacent rib far enough below the upper circle 7 of the framework of the setting of the rings so that there is an entrance space between the upper circle 7 and the said resilient members for the head 2 of the connector to pass between the upper circle and the resilient members and into the interior of the framework while the connector is still above the wings. Thus the entrance space for the head of the connector is at the opposite end of the restricted neck space from that at which the locking space is located. It will be seen from Figs. 5 and 6 that when the connector 1 is forced all the way down between the two resilient members and into the locking space between the lower ends thereof, the head 2 cannot be withdrawn from the interior of the framework of the setting, except purposely, and the two rings are locked together. As shown in Fig. 6, because of the resilience of the members 9 and 10, they spring back to their normal contour after the neck 3 of connector 1 has passed downwardly through the restricted neck space, at least partly closing said neck space above the neck 3 of the connector 1, and it is only by purposely pushing said connector upwardly again, forcing the resilient members 9 and 10 apart at their restricted neck space so that the two rings can be released from each other.

Figure 7:
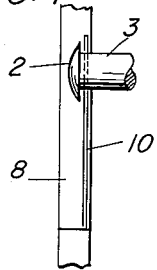
Figure 8:
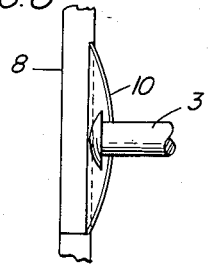
Figure 9:
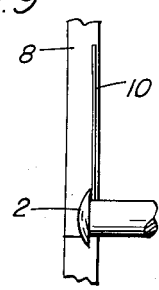

Figs. 7-9 are vertical sections through the framework of the setting at right angles to the plane of the wedding ring A. Fig. 7 shows the ring A with connector 1, preparatory to moving down between the two resilient members 9 and 10. It will be seen that in this diagrammatic view, both resilient members 9 and 10 lie in the plane of the side of the framework in which they are disposed. As part of the action of forcing the two resilient members 9 and 10 apart to permit passage of the neck 3 of the connector, said resilient members have bulged outwardly from the plane of the said side wall, as shown in Fig. 8, thus completing the separation of the two resilient members at their point of closest approach, i. e. at the restricted neck portion between the opposed convex edges of said members, without relying upon deformation of said resilient members entirely in the plane of said side wall.

Figure 1:
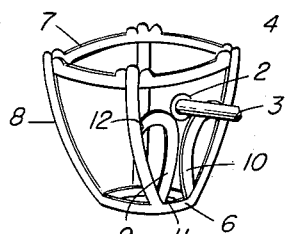
Figure 2:
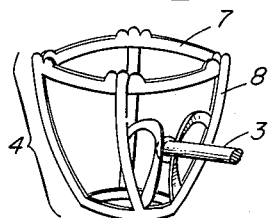
Figure 3:
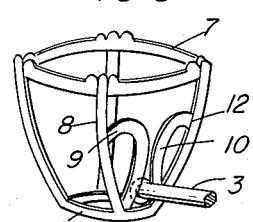
Figure 4:
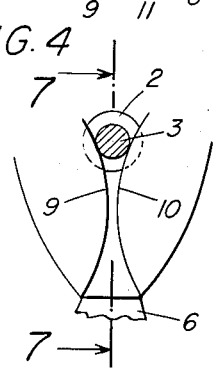
Figure 5:
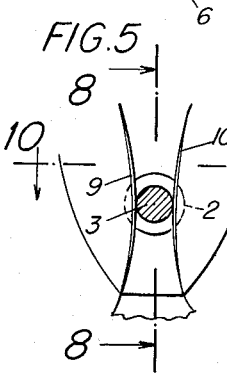

In Figs. 3, 6 and 9 the connector is shown in its lowermost position where, owing to the relative size and shape of the locking space between the lower edges of the resilient members 9 and 10, there is room for the neck of the connector without deformation of said resilient members. While in Fig. 6 I have shown the neck of the connector in contact with the spaced opposed edges of the lower portion of the convex edges of the resilient members, it is not necessary to have it fit that close.

Figure 10:
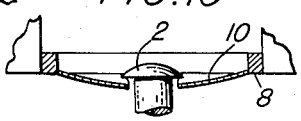
Fig. 10 is a view in horizontal section through the wall of the framework taken on the line 10—10 of Fig. 5, looking downwardly on the end of the connector at the time of maximum bulge outwardly of the resilient members.

Fig. 10 corresponds to Fig. 8 and is a further illustration of the bowing out or tilting movement to assist in the separation of the resilient members. Tilting the wall of the framework also helps to increase the spring action just described.

Figure 12:
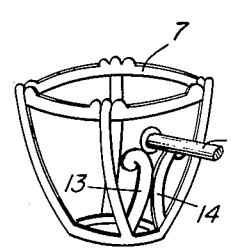
Figs. 12 and 13 are views corresponding to Figs. 1 and 3, respectively, but of a modified form of resilient members, embodying my invention.
Figure 13:
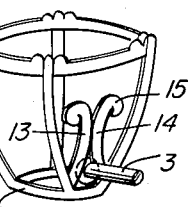

In the embodiment of Figs. 1-10 the resilient members are in the form of two strips which are held at both ends. The opposed convex edges of said resilient members 9 and 10 are so close together that the restricted neck space between them at their point of closest approach is normally smaller than the shank or neck of the connector. The increase in size of the space between the said opposed convex edges at their point of closest approach is obtained both by deformation in the plane in which they are mounted and by bending or bulging outwardly of said plane. In Figs. 11 and 12 I have shown an embodiment of my invention in which the resilient members are connected to the setting only at the lower ends thereof. They are what may be called prongs 13, 14 and will more easily give in the plane of the setting when pressure is applied to permit passage of the connector. In this case, there is no necessity for the resilient members bulging out of the plane of the side wall in which they are mounted. If required, more strength can be obtained in the prongs 13, 14 by using flat wire instead of flat strip material. It will be seen in these cases that the bending can be limited in extent by ultimate contact of the free ends of the prongs 13, 14 with the adjacent ribs 8. It will be noted that these free ends 15 are curled in on themselves so as not to catch easily on any objects with which the ring may come in contact.

The simplicity and strength of my novel construction will be obvious to all those skilled in the art of making finger rings.

What I claim is:

1. A finger ring having an ornamental gem-setting basket frame-work thereon consisting of an outer gem-setting member spaced from the ring body by members defining walls extending upwardly from said ring body, at least one of said walls being a side wall of the framework and having therein an opening defined by spaced edges including side edges; a pair of resilient members having convex outer edges and concave inner edges and mounted within said opening between the side edges thereof with their convex edges disposed in opposed confronting relation, said resilient members constituting part of the ornamental design of said frame-work and extending upwardly from spaced positions adjacent said ring body toward said outer gem-setting member to form between their convex edges a lower locking space adjacent said ring body, an intermediate resilient restricted neck space, and an upper entrance space, said resilient members each having that portion of their concave edge which is adjacent said restricted neck space spaced from an adjacent side edge of said opening to define between said concave edge and said adjacent side edge an opening to permit flexing of said resilient member toward said adjacent side edge, said spaces between said convex edges adapted to receive therein the neck portion of a headed connector projecting from an adjacent side surface of a second finger ring and having a head portion of greater diameter than the neck portion thereof and greater than that of said locking space, the neck portion of said connector being movable into said entrance space, then downwardly through said intermediate neck space and into said locking space to interlock the enlarged head of said connector behind said resilient members at said locking space to maintain said rings in interlocked relation until purposely released.

2. A finger ring having an ornamental gem-setting basket frame-work thereon as defined in claim 1 wherein said resilient members are free to move with relation to each other not only in the plane of the wall in which said opening is located but also to bulge outwardly of said plane, whereby upon passage of the neck of the connector through said restricted neck space said resilient members will flex apart both in said plane and outwardly of said plane.

3. A finger ring having an ornamental gem-setting basket frame-work thereon as defined in claim 1 wherein said resilient members are metal strips attached only at their lower ends at said spaced positions adjacent said ring body, the upper ends of said members being freely movable in the plane of the side wall in which said resilient members are mounted.

References Cited in the file of this patent

UNITED STATES PATENTS

| 2,059,228 | Granat | Nov. 3, 1936 |
| 2,534,061 | Rogers | Dec. 12, 1950 |